US009455959B1

(12) United States Patent
Garg et al.

(10) Patent No.: US 9,455,959 B1
(45) Date of Patent: Sep. 27, 2016

(54) METHOD OF CONNECTING SECURITY GATEWAY TO MESH NETWORK

(71) Applicant: Parallel Wireless Inc., Nashua, NH (US)

(72) Inventors: Sumit Garg, Hudson, NH (US); Kaitki Agarwal, Westford, MA (US); Rajesh Kumar Mishra, Westford, MA (US); David J. Ruffen, Salem, NH (US)

(73) Assignee: Parallel Wireless, Inc., Nashua, NH (US)

( * ) Notice: Subject to any disclaimer, the term of this patent is extended or adjusted under 35 U.S.C. 154(b) by 76 days.

(21) Appl. No.: 14/289,821

(22) Filed: May 29, 2014

Related U.S. Application Data

(60) Provisional application No. 61/829,503, filed on May 31, 2013.

(51) Int. Cl.
*G06F 9/00* (2006.01)
*G06F 15/16* (2006.01)
*G06F 17/00* (2006.01)
*H04L 29/06* (2006.01)
*H04W 12/00* (2009.01)
*H04L 12/46* (2006.01)

(52) U.S. Cl.
CPC ....... *H04L 63/0281* (2013.01); *H04L 12/4633* (2013.01); *H04L 63/0272* (2013.01); *H04L 63/16* (2013.01); *H04W 12/00* (2013.01)

(58) Field of Classification Search
CPC ............. H04L 63/16–63/168; H04L 63/0272; H04L 63/0281; H04L 12/4633; H04L 45/00
See application file for complete search history.

(56) References Cited

U.S. PATENT DOCUMENTS

| 7,373,660 | B1 * | 5/2008 | Guichard ............... H04L 47/10 726/15 |
| 7,974,220 | B2 | 7/2011 | Elias et al. |
| 8,064,909 | B2 * | 11/2011 | Spinelli ................. H04W 36/36 455/436 |
| 8,127,349 | B2 | 2/2012 | Liu et al. |
| 8,355,695 | B2 | 1/2013 | Korhonen |
| 8,397,288 | B2 | 3/2013 | Melvin, Jr. et al. |

(Continued)

FOREIGN PATENT DOCUMENTS

| EP | 2237612 A1 * | 10/2010 | ........... H04L 45/302 |
| EP | 1560378 B1 | 11/2012 | |

(Continued)

OTHER PUBLICATIONS

Cisco. "Dynamic Multipoint IPsec VPNs (Using Multipoint GRE/NHRP to Scale IPsec VPNs)," Jan. 2006.*

(Continued)

*Primary Examiner* — Christopher Revak
*Assistant Examiner* — Vadim Savenkov
(74) *Attorney, Agent, or Firm* — Michael Y. Saji

(57) ABSTRACT

In this invention we disclose methods for incorporating a security gateway within a wireless mesh network. In one embodiment, the wireless mesh network is a heterogeneous mesh network. In one embodiment, a gateway node, which is part of the wireless mesh network, requests a connection to the core network through a security gateway. The security gateway responds by creating an IPSec tunnel and a GRE tunnel within the IPSec tunnel from itself to the gateway node. Once the gateway node is communicatively coupled to the security gateway via secure tunneling, the gateway node sends a mesh routing protocol to the security gateway.

16 Claims, 3 Drawing Sheets

(56) References Cited

U.S. PATENT DOCUMENTS

| | | |
|---|---|---|
| 8,423,760 B2 | 4/2013 | Kant et al. |
| 8,824,430 B2 | 9/2014 | Ioannidis |
| 2002/0077151 A1 | 6/2002 | Matthews et al. |
| 2004/0223497 A1* | 11/2004 | Sanderson .......... H04L 12/4641 370/395.52 |
| 2005/0074019 A1 | 4/2005 | Handforth et al. |
| 2005/0153725 A1 | 7/2005 | Naghian et al. |
| 2007/0189290 A1 | 8/2007 | Bauer |
| 2007/0223451 A1* | 9/2007 | Ren ....................... H04W 40/14 370/352 |
| 2009/0106831 A1* | 4/2009 | Wu ........................ H04L 63/062 726/15 |
| 2009/0111456 A1 | 4/2009 | Shaffer et al. |
| 2009/0157901 A1* | 6/2009 | Asati ................. H04L 29/12386 709/238 |
| 2012/0054852 A1* | 3/2012 | Gibbs ................... H04L 63/164 726/15 |
| 2012/0058765 A1 | 3/2012 | Choi |
| 2012/0144066 A1* | 6/2012 | Medved .................. H04L 45/02 709/242 |
| 2013/0070745 A1* | 3/2013 | Nixon .................... H04L 45/74 370/338 |
| 2013/0097418 A1 | 4/2013 | Bhatt et al. |
| 2014/0068750 A1 | 3/2014 | Tjahjono et al. |
| 2014/0108665 A1* | 4/2014 | Arora ................... H04L 67/141 709/227 |

FOREIGN PATENT DOCUMENTS

| | | |
|---|---|---|
| KR | 101189673 B1 | 10/2012 |
| WO | 2011092698 A1 | 8/2011 |
| WO | 2014185638 A1 | 11/2014 |
| WO | 2014207712 A1 | 12/2014 |

OTHER PUBLICATIONS

Pekka Wainio, Tuomas Taipale, Nicklas Beijar, Eyal Ezri, Carmi Zisapel, & Mounir Kellil, "Innovative Solutions for Mobile Backhaul," MEVICO, Mobile Networks Evolution for Individual Communication Experience, D3.2, Nov. 8, 2016, retrieved from http://www.mevico.org/D32.pdf.

* cited by examiner

METHOD OF CONNECTING SECURITY GATEWAY TO MESH NETWORK

CROSS-REFERENCE TO RELATED APPLICATIONS

This application claims priority to the following U.S. Provisional Patent Application No. 61/829,503 entitled "Method of Connecting Security Gateway to Mesh Network" filed May 31, 2013, the entire contents of which is hereby incorporated by reference.

FIELD

The present invention relates generally to wireless multimedia telecommunications. More specifically, this invention relates to incorporating a security gateway within a wireless mesh network.

BACKGROUND

The advent and rise of the Internet has permitted the wide spread use of electronic forms of communication across vast distances at high speeds. The speed of data transmission is of paramount importance for any network. Data speed is a function of network efficiency. Therefore, the more efficiently a network operates, the greater the data speed it can provide to its clients.

But data speed is not the only important metric within a wireless communication network. There is also the issue of security. Typically, in wireless networks, a security gateway is placed between a wireless network and the core network. The purpose of the security gateway is eponymous—it provides data security. This is typically done by creating a layer 3 VPN tunnel between the security gateway and the wireless network. In practice, there are frequently several VPN tunnels existing between a security gateway and a wireless network.

FIG. 1 shows a prior art rendering of this technique. FIG. 1 depicts a wireless mesh network, consisting of wireless nodes 110, 112, and 114, communicatively coupled to a security gateway 130. In this network, each wireless node 110, 112, 114 has an independent VPN connection 120, 122, 124, respectively, to the security gateway. The security gateway 130 provides the wireless mesh network with secure access to the core network 140.

Although using a VPN tunnel as a communication conduit for a wireless network is a relatively secure means of transmitting data, the technique has disadvantages, particularly in the context of interfacing with a mesh network. First, the security gateway cannot automatically route packets into the mesh network because the mesh routing tables are not automatically updated within the security gateway. This means, when link costs within a mesh network change, as they often do, the security gateway does not receive updated routing information that reflects these changes in routing costs. When this happens, the security gateway uses suboptimal routing paths, which increases network overhead. Second, the creation of a secure tunnel for many, or all, of the wireless base stations within a wireless mesh results in multiple tunnels, sometimes referred to as a "tunnel within a tunnel" scenario, which is inefficient from an overhead perspective. Finally, meshed routing protocols can become increasingly complex because there are multiple routes to reach a given wireless base station from the security gateway. It is, therefore, desirable to find a way to mitigate these adverse effects.

SUMMARY OF THE INVENTION

In this invention we disclose methods for incorporating a security gateway into a mesh network. In some embodiments, the mesh network is a heterogeneous mesh network. The term heterogeneous means "diverse or different in character." In the context of a mesh network, the diversity or heterogeneity can be, without limitation, different radio access or backhaul technologies, different protocols, different frequency bands, different duplexing schemes, different elements in the packet core, mobile and stationary nodes, wired and wireless nodes, virtualized and non-virtualized elements or nodes, small cells, macro cells, femtocells, picocells, and any combination thereof.

In one embodiment a gateway node, which is part of a wireless mesh network, sends a request to a security gateway to initiate the creation of an internet protocol security (IPSec) tunnel After receiving the request from the gateway node, the security gateway creates an IPSec tunnel between itself and the gateway node. The security gateway node also creates a generic routing encapsulation Layer 2 tunnel inside of the IPSec tunnel After establishment of these two tunnels, the gateway node sends a current mesh routing protocol to the security gateway. In this way, the security gateway becomes integrated into the wireless mesh network, or in an alternate embodiment, into the heterogeneous mesh network.

Once the connection between the gateway node and the security gateway has been established, the gateway node can continue to provide the security gateway with updated mesh routing tables. In this way, the security gateway can dynamically respond to changing conditions within the mesh network and can reduce routing overhead as a result. By way of example, and without limiting the scope of the invention, mesh routing protocols include: OLSR, batman, babel and wireless optimized OSPF, Linux, and the like.

DETAILED DESCRIPTION

One inherent tension within wireless networks is the tradeoff between providing data security and enhancing data throughput. The ultimate goal of a wireless network is to push as much data through the network as quickly and reliably as possible. This goal has to be balanced against the security needs of a particular network or type of data traffic. Some data must be transported more securely than other data. Likewise, some data must be transported faster than other data. In this never-ending balance, every bit per second of data speed counts. And it is in making incremental increases in data speed that overall network performance will be improved.

Toward that end, the following are some ways in which incremental gains in network throughput can be achieved according to embodiments of the present invention: reducing data encapsulation requirements; reducing the total amount of header information needed to accompany data packets; using the most up-to-date routing table for a mesh network; and reducing the number of unnecessary mesh hops.

Figure 1:
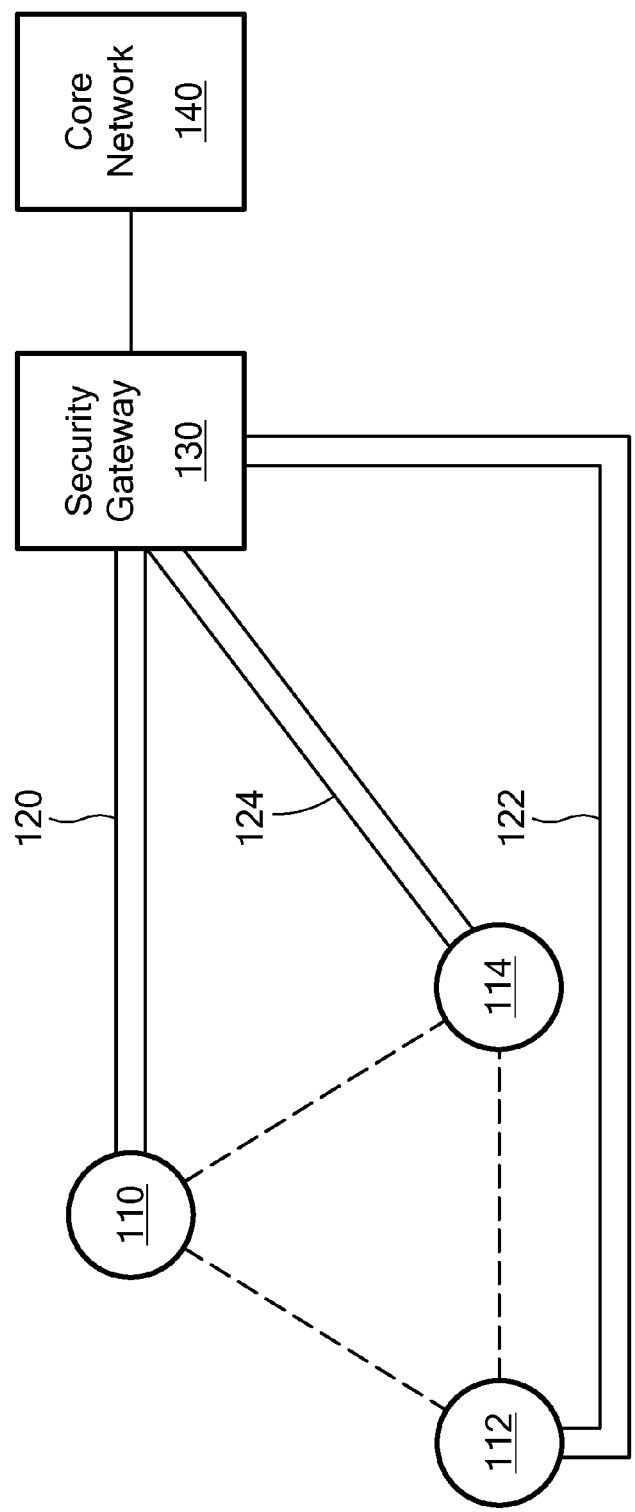
FIG. 1 is a prior art diagram of a security gateway providing core network connectivity to a wireless network.
Figure 2:
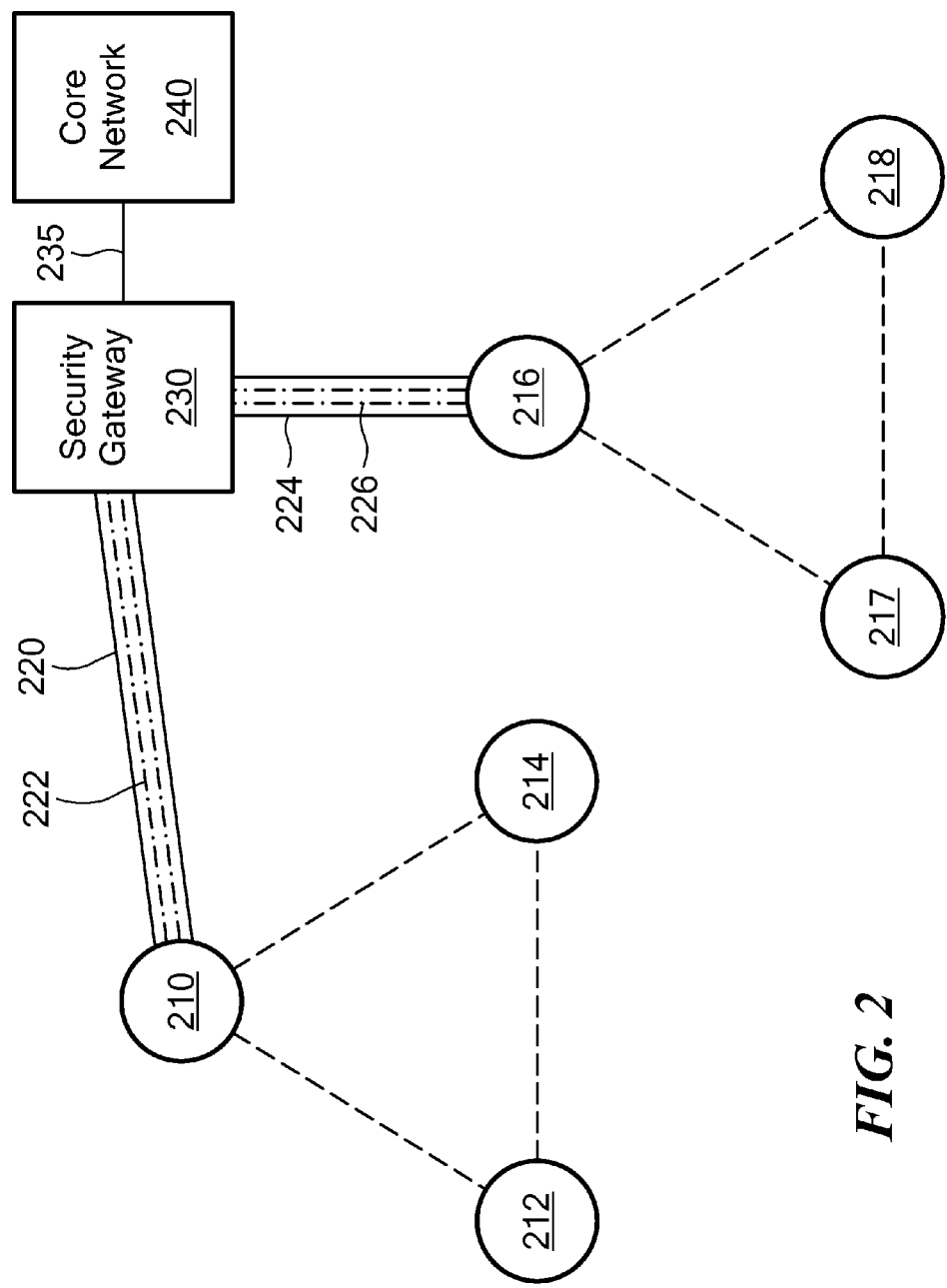
FIG. 2 is a diagram of a security gateway integrated into a mesh network.

FIG. 2 shows a network upon which embodiments of the present invention can be run. Specifically, FIG. 2 depicts a wireless network comprised of three nodes. In this wireless mesh network, one wireless node acts as a gateway node 210. FIG. 2 could also be a heterogeneous wireless mesh network in an alternate embodiment. The ensuing description is equally viable for a heterogeneous mesh network. The other two wireless nodes 212 and 214 have a wireless backhaul link to the gateway node 210. The wireless nodes 210, 212, 214 could have access and backhaul radios that support transmission over LTE, Advanced LTE, Wi-Fi, WCDMA, TV White Space, and the like. In one embodiment, the security gateway 230 could be a server, processor, or other computing device hosted in a computing cloud. Although there are only three wireless nodes shown in FIG. 2, those of skill in the art will recognize that the wireless mesh network, or heterogeneous mesh network, could be comprised of many more wireless nodes. In addition, there could be more than one gateway node 210 connected to the security gateway 230.

As can be seen from FIG. 2, the gateway node 210 is communicatively coupled to a security gateway 230 via an IPSec tunnel 220, which has a GRE tunnel 222 encapsulated therein. The layer 2 tunneling protocol could be L2TP or similar protocol known to those of skill in the art. The data passing between the gateway node 210 and the security gateway 230 are encrypted. The IPSec tunnel 220 creates a secure link between the gateway node 210 and the security gateway 230. The GRE tunnel 222 allows us to extend the mesh protocol to the security gateway 230 within the secure envelope provided by the IPSec tunnel 220. This also allows us to run a private IP network between the mesh network, comprised of nodes 210, 212, and 214, and the security gateway 230. In an additional embodiment, the IP addresses for the mesh nodes 210, 212, 214 can be provided by the security gateway 230 using DHCP or some other address management protocol well known to those of skill in the art.

One benefit of this is that routing becomes easier to manage. For example, in one embodiment, the security gateway 230 could communicate with gateway node 210 and 216. The security gateway 230 and the gateway nodes 210 and 216 could exchange information with one another. For example, the security gateway 230 may in one embodiment advertise a default route to the gateway nodes 210 and 216. In an alternate embodiment, the security gateway 210 could request and receive mesh routing information from gateway nodes 210 and 216. When security gateway node 230 learns the mesh routes from gateway node 210, it will not share these routes with gateway node 216. Similarly, the security gateway 230 will not share mesh routes learned from gateway node 216 with gateway node 210. In this way, security gateway node keeps the two mesh networks independent of one another. Although this embodiment is described with reference to two mesh networks and two gateway nodes, those of skill in the art will recognize that there could be many mesh networks and many gateway nodes.

One benefit that these embodiments provide is smaller routing tables, which in turn results in less network overhead. An additional advantage of including the security gateway 230 within the mesh network is, the user's anchor point can be the security gateway 230 if the user traffic is bridged directly from the gateway node 210 to the security gateway 230. As a result, if a user is roaming around a particular wireless network and must be handed off from one wireless node 212 to another 214, for example, the handoff is easier to perform than would be the case in the prior art because there is no need to change the user's IP address. At least one benefit of anchoring a user's IP address at the security gateway 230 is reduced network overhead.

Figure 3:
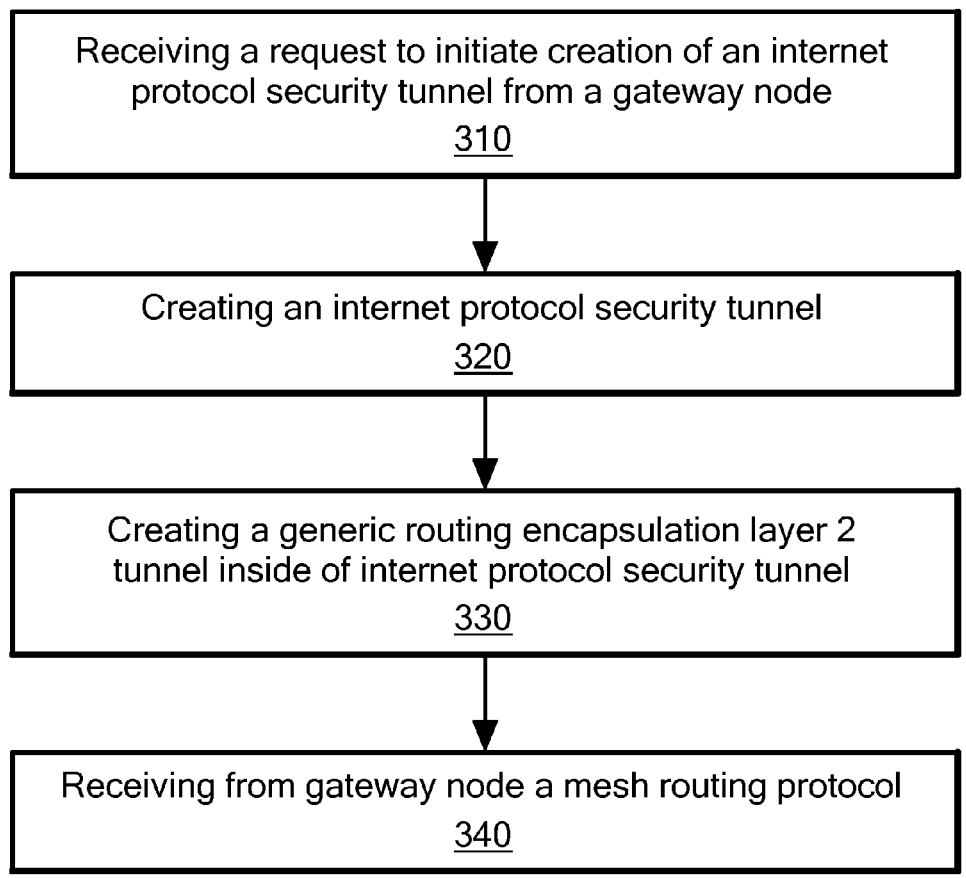
FIG. 3 is a flow diagram of method steps for incorporating a security gateway into a mesh network.

Turning to methods for incorporating a security gateway into a mesh network or a heterogeneous mesh network, FIG. 3 shows a flow diagram of the steps of an embodiment capable of performing this incorporation. In this embodiment, the security gateway 230 receives 310 a request to initiate creation of an internet protocol security tunnel. This request could come from, for example, a gateway node 210. Once the security gateway receives 310 this request, it could create 320 an internet protocol security tunnel Additionally, the security gateway could create 330 a generic routing encapsulation Layer 2 tunnel inside of the internet protocol security tunnel Both of these tunnels would connect the security gateway 230 to the gateway node 210. Once this connection has been established, the gateway node 210 could send a mesh routing protocol to the security gateway 230. When the security gateway 230 receives 340 the mesh routing protocol, it will have become integrated into the mesh network.

In an alternate embodiment, the security gateway could send the mesh routing protocol to the core network server. In another alternate embodiment, the security gateway and the core network server may be collapsed into single server (logically, virtually and/or physically).

In alternate embodiments, the methods described herein could be used to integrate a Home Node B Gateway into a mesh network or a heterogeneous mesh network. A Home Node B is the 3GPP term for a 3G femtocell or small cell. A Node B is an element of a 3G macro radio access network. A femtocell performs many of the functions of a Node B, but is optimized for deployment in indoor premises and small coverage hotspots. The femtocell was originally conceived for residential environments. It has, however, evolved to include other usages such as enterprise and public hotspots.

Within a home node B access network there are three new network elements: the Home Node B (or femtocell), the security gateway, and the Home Node B Gateway. A home node B or femtocell provides 3G radio coverage for 3G handsets. Home node B's incorporate the capabilities of a standard node B as well as the radio resource management functions of a standard radio network controller. The security gateway, as discussed above, establishes IPSec tunnels that are responsible for delivering all voice, messaging, and packet data services between home node Bs and the core network. The security gateway forwards traffic to the home node B gateway.

The home node B gateway aggregates traffic from a large number of home node Bs back into an existing core service network through the Iu-cs and Iu-ps interfaces. In the case of a home node B access network, the EPC is aware of each of the femtocells that are part of the network. In the mesh networks and methods of integrating a security gateway into the mesh networks of the present invention, the EPC is not aware of the individual multi-access radios that comprise the mesh network. When the methods of the present invention are used to integrate a home node B gateway and a security gateway into a mesh network or a heterogeneous mesh network, the network can achieve paging optimization as described above.

In an alternate embodiment, the methods described herein could be used to integrate a home eNodeB gateway into mesh network or a heterogeneous mesh network. A home eNodeB gateway is similar to a home NodeB gateway except that a home eNodeB gateway is used in an LTE network.

The foregoing discussion discloses and describes merely exemplary embodiments of the present invention. In additional embodiments, the methods described herein can be stored on a computer readable medium such as a computer memory storage, a compact disk (CD), flash drive, optical drive, or the like. Further, the computer readable medium could be distributed across memory storage devices within multiple servers, multi-RAT nodes, controllers, computing cloud components, mobile nodes, and the like. As will be understood by those skilled in the art, the present invention may be embodied in other specific forms without departing from the spirit or essential characteristics thereof. For example, wireless network topology can also apply to wired networks, optical networks, and the like. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology.

What is claimed is:

1. A method of incorporating a security gateway within a mesh network comprising:
   receiving at a security gateway a request to initiate creation of an internet protocol (IP) security tunnel from the security gateway to a gateway node, the gateway node being a mesh node of a mesh network;
   creating the IP security tunnel from the security gateway to the gateway node;
   creating a generic routing encapsulation (GRE) Layer 2 tunnel inside of the IP security tunnel;
   requesting at the security gateway an IP-protocol mesh routing table from the gateway node; and
   receiving at the security gateway the IP-protocol mesh routing table from the gateway node,
   wherein the IP-protocol mesh routing table includes a route to a second non-gateway mesh node via the gateway node.

2. The method of claim 1, further comprising analyzing, at the security gateway, the mesh routing table to determine a routing path for data transmission with improved mesh throughput.

3. The method of claim 1, further comprising advertising a default route.

4. The method of claim 1, wherein the security gateway is at a second mesh node of the mesh network.

5. The method of claim 1, further comprising sending the mesh routing table to a core network server.

6. The method of claim 1, further comprising:
   requesting and receiving a second mesh routing table from a second gateway node;
   keeping the mesh routing table independent from the second gateway node; and
   keeping the second mesh routing table independent from the gateway node.

7. The method of claim 1, wherein the mesh routing table is a single route.

8. The method of claim 1, wherein the mesh routing table is a portion of a routing table.

9. A non-transitory computer readable storage medium, storing thereon a computer program comprising instructions that, when executed by a computer system, cause the computer system to perform operations comprising:
   receiving at a security gateway a request to initiate creation of an internet protocol (IP) security tunnel from the security gateway to a gateway node, the gateway node being a mesh node of a mesh network;
   creating the IP security tunnel from the security gateway to the gateway node;
   creating a generic routing encapsulation (GRE) Layer 2 tunnel inside of the IP security tunnel;
   requesting at the security gateway an IP-protocol mesh routing table from the gateway node; and
   receiving at the security gateway the IP-protocol mesh routing table from the gateway node,
   wherein the IP-protocol mesh routing table includes a route to a second non-gateway mesh node via the gateway node.

10. The non-transitory computer readable storage medium of claim 9, the instructions further comprising analyzing, at the security gateway, the mesh routing table to determine a routing path for data transmission with improved mesh throughput.

11. The non-transitory computer readable storage medium of claim 9, the instructions further comprising advertising a default route.

12. The non-transitory computer readable storage medium of claim 9, wherein the security gateway is at a second mesh node of the mesh network.

13. The non-transitory computer readable storage medium of claim 9, the instructions further comprising sending the mesh routing table to a core network server.

14. The non-transitory computer readable storage medium of claim 12, the instructions further comprising:
   requesting and receiving a second mesh routing table from a second gateway node;
   keeping the mesh routing table independent from the second gateway node; and
   keeping the second mesh routing table independent from the gateway node.

15. The non-transitory computer readable storage medium of claim 9, wherein the mesh routing table is a single route.

16. The non-transitory computer readable storage medium of claim 9, wherein the mesh routing table is a portion of a routing table.

* * * * *